(12) United States Patent
Ly et al.

(10) Patent No.: US 8,401,193 B2
(45) Date of Patent: Mar. 19, 2013

(54) SYSTEM AND METHOD FOR SECURING WIRELESS COMMUNICATIONS

(75) Inventors: Hung D. Ly, College Station, TX (US); Yufei Blankenship, Kildeer, IL (US); Tie Liu, Sugar Land, TX (US)

(73) Assignee: FutureWei Technologies, Inc., Plano, TX (US)

(*) Notice: Subject to any disclaimer, the term of this patent is extended or adjusted under 35 U.S.C. 154(b) by 203 days.

(21) Appl. No.: 12/915,521

(22) Filed: Oct. 29, 2010

(65) Prior Publication Data

US 2012/0106737 A1   May 3, 2012

(51) Int. Cl.
*H04L 9/00* (2006.01)
(52) U.S. Cl. ............... 380/270; 380/33; 380/255
(58) Field of Classification Search ............... 380/270
See application file for complete search history.

(56) References Cited

U.S. PATENT DOCUMENTS

| | | | | |
|---|---|---|---|---|
| 2007/0058808 | A1* | 3/2007 | Rudolf et al. | 380/44 |
| 2007/0165845 | A1 | 7/2007 | Ye et al. | |
| 2007/0177729 | A1* | 8/2007 | Reznik et al. | 380/44 |
| 2008/0304658 | A1* | 12/2008 | Yuda et al. | 380/44 |
| 2010/0313025 | A1* | 12/2010 | Tsouri | 713/171 |

FOREIGN PATENT DOCUMENTS

| | | |
|---|---|---|
| CN | 1993923 A | 7/2007 |
| CN | 101375544 A | 2/2009 |

OTHER PUBLICATIONS

Sadjadi et al., "Robust Key Generation from Signal Envelopes in Wireless Networks", 2007, ACM, pp. 401-410.*
Li et al., "Securing Wireless Systems via Lower Layer Enforcements", 2006, ACM, pp. 33-42.*
"3rd Generation Partnership Project; Technical Specification Group Radio Access Network; Evolved Universal Terrestrial Radio Access (E-UTRA); Physical Channels and Modulation (Release 9)," 3GPP TS 36.211, V9.1.0, Mar. 2010, 85 pages.
Ahlswede, R., et al., "Common Randomness in Information Theory and Cryptography-Part I: Secret Sharing," IEEE Transactions on Information Theory, vol. 39, No. 4, Jul. 1993, pp. 1121-1132.
Csiszar, I., et al., "Broadcast Channels with Confidential Messages," IEEE Transactions on Information Theory, vol. IT-24, No. 3, May 1978, pp. 339-348.
Diffie, W., et al., "New Directions in Cryptography," IEEE Transactions on Information Theory, 1976, 12 pages.
Hassan, A.A., et al., "Cryptographic Key Agreement for Mobile Radio," Digital Signal Processing, Article No. 0023, 1996, pp. 207-212.
Koorapaty, H., et al., "Secure Information Transmission for Mobile Radio," IEEE Communications Letters, vol. 4, No. 2, Feb. 2000, pp. 52-55.
Mathur, S., et al., "Radio-telepathy: Extracting a Secret Key from an Unauthenticated Wireless Channel," ACM, 2008, 12 pages.

(Continued)

Primary Examiner — Matthew Smithers
(74) Attorney, Agent, or Firm — Slater & Matsil, L.L.P.

(57) ABSTRACT

A system and method for securing wireless communications are provided. A method for secure communications by a first user includes estimating a channel between the first user and a second user, thereby producing an first phase estimate of the channel, generating a first block of secret bits based on the first phase estimate of the channel, and transmitting public information regarding the first block of secret bits to the second user. The second user makes use of the public information to generate a second block of secret bits.

25 Claims, 8 Drawing Sheets

OTHER PUBLICATIONS

Maurer, U.M., et al., "Secret Key Agreement by Public Discussion from Common Information," IEEE Transactions on Information Theory, vol. 39, No. 3, May 1993, pp. 733-742.

Patwari, N., et al., "High Rate Uncorrelated Bit Extraction for Shared Secret Key Generation from Channel Measurements," IEEE Transactions on Mobile Computing, Jan. 2010, pp. 1-15.

Rivest, R.L., et al., "A Method for Obtaining Digital Signatures and Public-Key Cryptosystems," ACM, vol. 21, No. 2, pp. 120-126, 1978.

Sayeed, A., et al., "Secure Wireless Communications: Secret Keys Through Multipath," ICASSP, 2008, 4 pages.

Shannon, C.E., "Communication Theory of Secrecy Systems," A Mathematical Theory of Cryptography, Sep. 1, 1946, pp. 657-715.

Wilson, R., et al., "Channel Identification: Secret Sharing Using Reciprocity in Ultrawideband Channels," IEEE Transactions on Information Forensics and Security, vol. 2, No. 3, Sep. 2007, pp. 364-375.

Wyner, A.D., "The Wire Tap Channel," The Bell System Technical Journal, vol. 54, No. 8, Oct. 1975, pp. 1355-1387.

Zheng, Y.R., et al., "Improved Models for the Generation of Multiple Uncorrelated Rayleigh Fading Waveforms," IEEE Communications Letters, vol. 6, No. 6, Jun. 2002, pp. 256-258.

PCT International Search Report and Written Opinion, received in Patent Cooperation Treaty Application No. PCT/CN2011/081368, mailed Feb. 9, 2012, 10 pages.

* cited by examiner

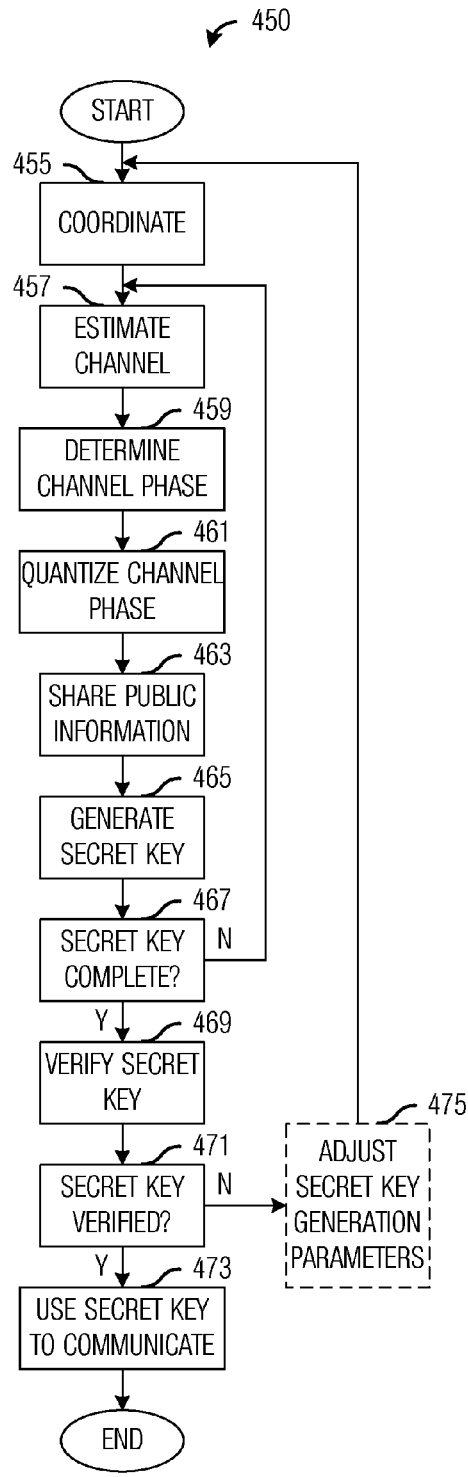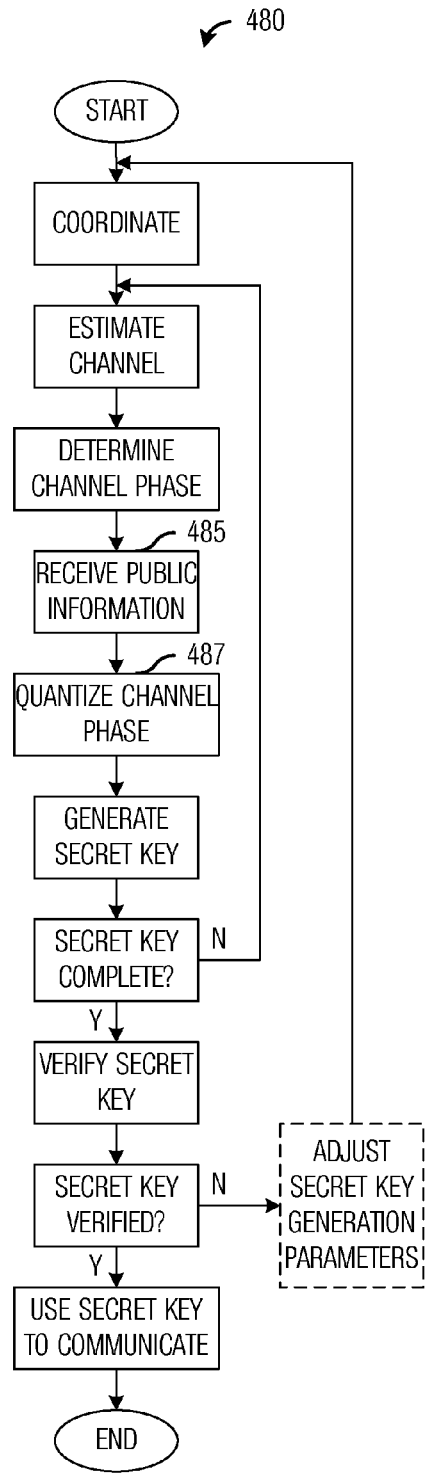
*Fig. 4c*  *Fig. 4d*

SYSTEM AND METHOD FOR SECURING WIRELESS COMMUNICATIONS

TECHNICAL FIELD

The present invention relates generally to wireless communications, and more particularly to a system and method for securing wireless communications.

BACKGROUND

Broadcasting is inherent to wireless communications. Any receiver operating within range of a transmission may be able to listen to the transmission and may be able to decode at least a portion of the transmission. The broadcast nature of wireless communications may be exploited to allow simultaneous transmissions to several receivers at high rates. However, eavesdropping may also become easier.

Cryptography is a traditional approach to protect transmissions against eavesdropping. In general, there are two different types of cryptographic systems: secret key cryptosystems and public-key cryptosystems. Secret key cryptosystems require a secret key shared between a sender and a receiver. Public-key cryptosystems do not require the pre-establishment of a secret key, but may be more susceptible to advanced attacks, such as man-in-the-middle attack. Both types of cryptosystems may be based on an assumption that the eavesdropper has limited computational power. For example, in the well-known RSA public-key cryptosystem, the security is based on the computational complexity involved in factoring large integers, while many other cryptosystems are based on the difficulty of computing discrete logarithms in certain groups. Therefore, traditional cryptosystems lack absolute security since given enough time and computation power, they may be broken.

FIG. 1 illustrates a prior art cipher system 100. Cipher system 100 may be illustrative of a Shannon cipher system. Shannon defined a secrecy system to be perfectly secret if the cipher text is statistically independent of the message. Perfect secrecy is the strongest notion of security since observing the cipher text does not reveal any information regarding the message. In cipher system 100, assumptions include: 1) transmitter 105 and receiver 110 share a secret key that is unknown to eavesdropper 115; 2) transmission of the message is noiseless to both receiver 110 and eavesdropper 115. Under these assumptions, cipher system 100 may be shown to have perfect secrecy if the length of the secret key is at least as long as the message.

Shannon's result on perfect secrecy systems is pessimistic. It has been shown that Shannon's pessimistic result is not due to the strong notion of information-theoretic security, but is a result of the assumption that the transmission of the message occurs over noiseless channels. By extending the Shannon cipher system to a noisy setting, it may be possible to design cipher systems that can deliver a message reliably to a receiver while keeping it asymptotically perfectly secret from an eavesdropper without the need for a secret key, shared initially between a transmitter and a receiver.

In fact, it has been shown that if the transmitter and the receiver observe a noisy channel between them, the noisiness of the channel may be used to generate a shared secret key that may be used to encrypt messages sent over the channel. Furthermore, if the transmitter and the receiver can communicate over an error-free public channel (herein referred to as public communications), they can generate the same secret keys with high probability. It is required that when the transmitter and the receiver communicate over a public channel, no significant knowledge about the secret key may be revealed. In other words, obtaining publicly communicated information must not give the eavesdropper knowledge about the secret key.

SUMMARY OF THE INVENTION

These and other problems are generally solved or circumvented, and technical advantages are generally achieved, by preferred embodiments of the present invention which provide a system and method for securing wireless communications In accordance with a preferred embodiment of the present invention, a method for secure communications by a first user is provided. The method includes estimating a channel between the first user and a second user, thereby producing a channel estimation comprising a first phase estimate of the channel, generating a first block of secret bits based on the first phase estimate of the channel, and transmitting public information regarding the first block of secret bits to the second user. The second user makes use of the public information to generate a second block of secret bits.

In accordance with another preferred embodiment of the present invention, a method for secure communications by a second user is provided. The method includes receiving public information from a first user, estimating a channel between the second user and the first user, thereby producing a channel estimation comprising a second phase estimate of the channel, and generating a second block of secret bits based on the public information and the second phase estimate of the channel.

In accordance with another preferred embodiment of the present invention, a communications device is provided. The communications device includes a channel estimate unit, a phase calculate unit coupled to the channel estimate unit, a key generate unit coupled to the phase calculate unit, and a verify unit coupled to the key generate unit. The channel estimate unit estimates a channel between the communications device and a remote communications device, the phase calculate unit calculates a phase estimate of the channel based on the estimate of the channel from the channel estimate unit, the key generate unit generates a block of secret bits based on the phase estimate of the channel and a public information, and the verify unit determines if a first block of secret bits generated by the key generate unit matches a second block of secret bits generated at the remote communications device.

An advantage of an embodiment is that a technique for generating a shared secret key at both a transmitter and a receiver from the wireless channel is provided. The technique ensures that the transmitter and the receiver are able to generate similar secret keys with high probability. Additionally, the high probability of generating matching secret keys at the transmitter and the receiver implies that the secret key generation process may not have to restart many times to obtain a desired shared secret key, and that the communication cost for acquiring the shared secret key is low.

A further advantage of an embodiment is that the technique for generating the secret key yields a secret key with a high degree of randomness, making it difficult for an eavesdropper to determine the secret key or otherwise intercepting and deciphering messages transmitted using the secret key.

Yet another advantage of an embodiment is that the eavesdropper may be able to at the very most obtain a negligible amount of information about the secret key, thereby allowing the secret key to be used for a longer period of time, reducing a need to frequently update the secret key, and so on.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized, by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 4c is a flow diagram of user operations in secret communications, wherein the secret communications makes use of a secret key generated using phase-based secret key generation with public communications;

FIG. 4d is a flow diagram of user operations in secret communications, wherein the secret communications makes use of a secret key generated using phase-based secret key generation with public communications;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a wireless communications system wherein there is a desire to provide secure communications between users of the wireless communications system.

Figure 1:
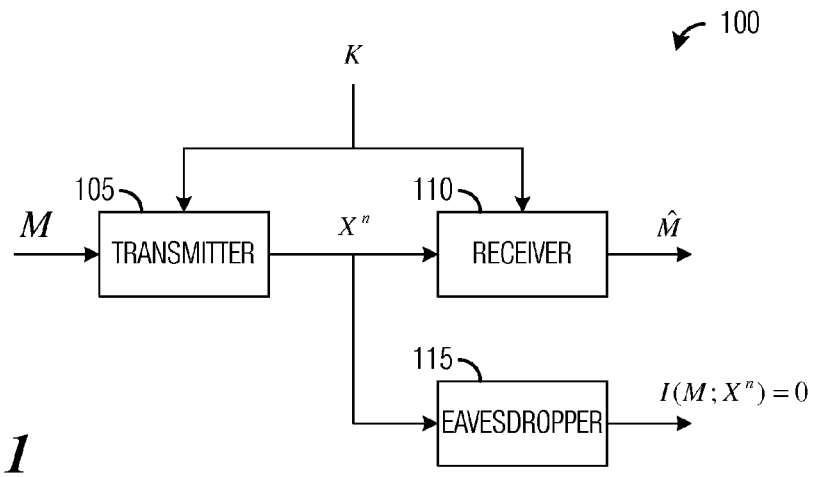
FIG. 1 is a diagram of a prior art cipher system.
Figure 2:
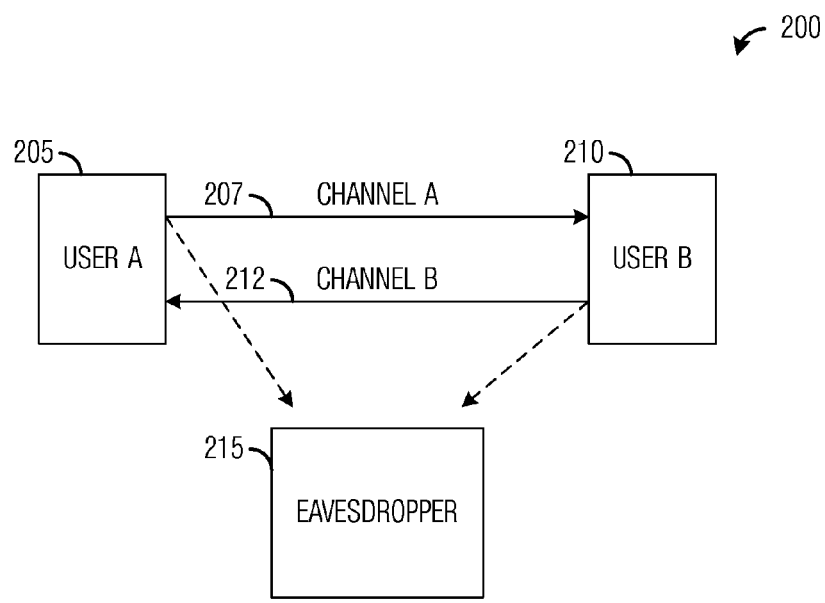
FIG. 2 is a diagram of a wireless communications system.

FIG. 2 illustrates a wireless communications system 200. Consider that wireless communications system 200 is a time-division duplex wireless communications system that includes two users, a user A 205 and a user B 210 with a channel A 207 between user A 205 and user B 210 and a channel B 212 between user B 210 and user A 205. User A 205 and user B 210 desire to have secure communications over channel A 207 and channel B 212. Wireless communications system 200 also includes an eavesdropper 215 that is desirous to intercept at least some of the communications between user A 205 and user B 210.

User A 205 and user B 210 may start communications by probing channels B 212 and A 207, respectively. Since wireless communications system 200 is a time-division duplex system, user A 205 and user B 210 may not be able to probe channels B 212 and A 207 at the same time. As an example, at a first time, user A 205 may transmit a pilot signal to user B 210 over channel A 207 and user B 210 may estimate channel A 207 based on the received pilot signal from user A 205. Similarly, at a second time, user B 210 may transmit a pilot signal to user A 205 over channel B 212 and user A 205 may estimate channel B 212 based on the received pilot signal from user B 210. Due to channel reciprocity, the estimates and phases of channels A 207 and B 212 should be the same (or substantially the same).

Assume that channel A 207 and channel B 212 are flat fading channels. Received signals at user A 205 and user B 210 due to the channel probes may be expressed as $$Y_a[m_1] = h_{ab} X_a[m_1] + Z_a[m_1] \tag{3.1}$$

and $$Y_b[m_2] = h_{ba} X_b[m_2] + Z_b[m_2], \tag{3.2}$$

where $Y_a$ is the received channel at User A 205 and $Y_b$ is the received channel at user B 210, $Z_i[m_i]$, $i \in \{a, b\}$, are independently identically distributed (i.i.d.) additive Gaussian noise with zero mean and variance $\sigma_i^2$, $X_i$ is the pilot signal, and $h_{ab}$ and $h_{ba}$ are the channel impulse responses of the uplink (from user A 205 to user B 210) and downlink (from user B 210 to user A 205) channels, respectively.

The channels (channel A 207 and channel B 212) are considered to be rich scattering fading channels, and eavesdropper 215 is at least half a wavelength away from user A 205 and user B 210. Due to the spatial decorrelation property of time-varying channels, eavesdropper 215 will observe channels that are statistically independent of those between user A 205 and user B 210. As a result, given the pilot signals, eavesdropper 215 may be unable to obtain any useful knowledge about the channel estimates of users A 205 and B 210.

Consider a point-to-point communications system where a transmitter transmits a pilot signal X[m] to a receiver over a wireless channel. Assume that the wireless channel is a flat fading channel. At the receiver, the received signal may be expressed as $$Y[m] = h[m] X[m] + Z[m], \tag{3.3}$$

where the pilot signal is of power P, h[m] is a sample (or estimate) of the wireless channel at time m with variance $\sigma_h^2$, and N[m] is an additive Gaussian noise with mean zero and variance $\sigma^2$.

If a minimum mean square error (MMSE) estimator is used, the channel estimate may be computed as $$\hat{h}[m] = \frac{\sigma_h^2}{\sigma_h^2 P + \sigma^2} X^T[m] Y[m]. \tag{3.4}$$

Furthermore, assume that the channel gain is normalized, i.e., $\sigma_h^2=1$, and denote the signal-to-noise ratio (SNR) as $$SNR = \frac{P}{\sigma^2}.$$

The channel estimate may be expressed as $$\hat{h}[m] = \frac{SNR}{1+SNR}h[m] + \frac{X^T[m]N[m]}{(1+SNR)\sigma^2} \quad (3.5)$$

and the minimum estimation error is expressible as $$\frac{1}{1+SNR}.$$

Therefore, the channel estimation may be modeled as $$\hat{h}[m] = h[m] + \Delta h[m], \quad (3.6)$$

where $\Delta h[m]$ is an estimation error.

Assume that the wireless channels are Rayleigh fading, which may be characterized by a complex Gaussian random variable with zero-mean and unit variance. The estimation error may be modeled by a complex Gaussian random variable with zero mean and variance $$\frac{1}{1+SNR}.$$

Therefore, the channel estimates at the legitimate users (i.e., the receiver and the transmitter) may be modeled as $$\hat{h}_a[m] = h_a[m] + \Delta h_a[m],$$

and $$\hat{h}_b[m] = h_b[m] + \Delta h_b[m], \quad (3.7)$$

where $\Delta h_a[m]$ and $\Delta h_b[m]$ are i.i.d complex Gaussian random variables with zero mean and variance $$\frac{1}{1+SNR}.$$

Note that legitimate users (user A 205 and user B 210, for example) access the wireless channel in different time slots and may have different channel estimation errors. Consequently, with high probability, the channel estimates at the legitimate users may not be similar. However, the reciprocity property of the electromagnetic waves ensures that the legitimate users can observe a similar channel response, i.e., $h_a[m_1]=h_b[m_2]$, as long as the legitimate users send the pilot signals to each other at a sufficiently fast rate. Hence, the channel estimates at the legitimate users are highly correlated and so are their estimated phases. Consequently, the estimated phases may be viewed as a common randomness that user A 205 and user B 210 may take advantage of to generate a secret key to be shared between them. The secret key generation from the phase of the wireless channel is referred to as phase-based secret key generation.

Figure 3A:
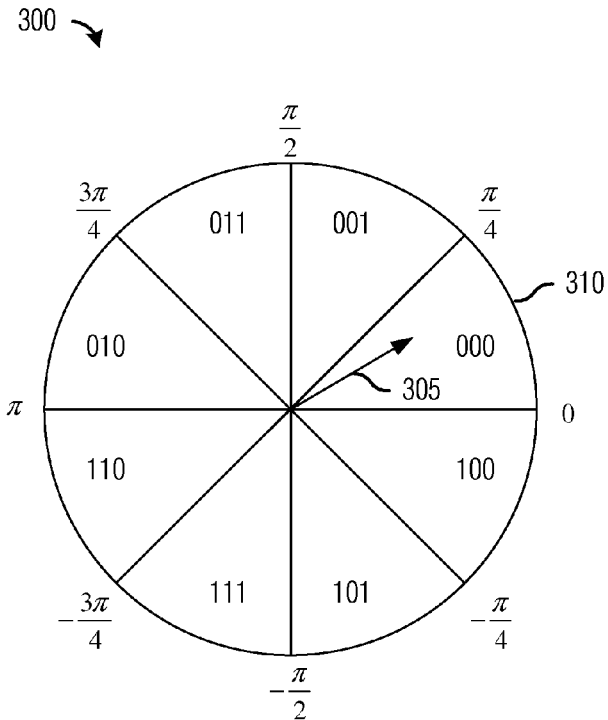
FIG. 3a is a phase quantization diagram for use in phase-based secret key generation without public communications.

A phase quantization scheme may contain Q bins of equal measure. The index of each bin can be encoded by a codeword of length k. FIG. 3a illustrates a phase quantization diagram 300 for use in phase-based secret key generation without public communications. Phase-based secret key generation without public communications may occur at both legitimate users participating in secret communications, with each legitimate user independently generating the secret key. After the secret keys are generated, the key verification may be performed to verify if the legitimate users have indeed generated identical secret keys.

In phase-based secret key generation without public communications, each legitimate user may make use of phase information of the channel between the legitimate users to independently generate the secret keys. Phase-based secret key generation without public communications may make use of a phase quantization diagram, such as phase quantization diagram 300 with Q=8 bins, to quantize a phase estimate of the channel and to generate secret bits for use in generating the secret key. Each of the Q bins may correspond to a k-bit codeword, where $Q=2^k$. For example, the Q bins of phase quantization diagram 300 may be labeled with 3-bit codewords numbered according to a Gray code. As shown in FIG. 3a, each of the Q bins are equal in size, spanning $$\frac{\pi}{4}$$

radians each. However, it may be possible to use different sized bins.

As an example, let vector 305 represent a phase estimate of the channel. Vector 305 falls within a bin corresponding to codeword "000", which may then be used to generate bits of the secret key. Any vector that falls within a single bin results in a codeword for the bin to be used to generate secret bits of the secret key. If the secret key is longer than the number of secret bits generated per vector, the phase estimation, phase quantization, and secret key generation may be repeated until a sufficient number of secret bits is generated for the secret key.

Figure 3B:
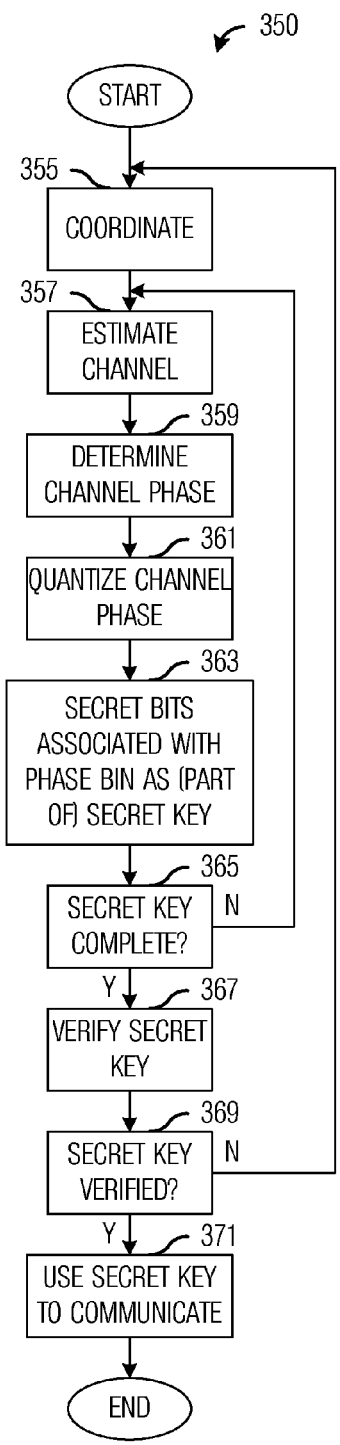
FIG. 3b is a flow diagram of user operations in secret communications, wherein the secret communications makes use of a secret key generated using phase-based secret key generation without public communications.

FIG. 3b illustrates a flow diagram of user operations 350 in secret communications, wherein the secret communications makes use of a secret key generated using phase-based secret key generation without public communications. User operations 350 may be indicative of operations occurring in a user, such as a legitimate user, as the user participates in secret communications with another user. User operations 350 may occur while the user is in a normal operating mode.

Without loss of generality, let a first of the legitimate users be referred to as a transmitter and a second of the legitimate users be referred to as a receiver. The embodiments described herein may be operable at either legitimate user, therefore, the terms transmitter and receiver may be used to simplify notation. For example, a transmitter in a first iteration of user operations 350 may become a receiver in a second iteration of user operations 350, and vice versa.

User operations 350 may begin with the transmitter coordinating with the receiver (block 355). The coordinating between the legitimate users may include specifying a length of the secret key, how often to update the secret key, how often to transmit pilot signals to generate the secret key, who goes first, a configuration of a phase quantization diagram, and so forth. After coordinating, the transmitter may estimate the channel between the legitimate users using a pilot sequence transmitted by the receiver (block 357). Based on the channel estimate, the transmitter may determine phase of the channel (block 359). Alternatively, phase of the channel may be estimated directly from the received signal (e.g., the received pilot signal).

The transmitter may then quantize the estimated phase of the channel using a phase quantization diagram, such as phase quantization diagram 300 (block 361). The bits associated with a quantized phase of the channel may then be used as the secret key, a part of the secret key, or provided to a function used to generate the secret key (block 363). A check may be performed to determine if the secret key is complete (block 365).

If the secret key is not complete, then the transmitter may return to block 357 to continue generating the secret key. If the secret key is complete, then the transmitter and the receiver may verify that both have generated the same secret key (block 367). As an example, the verification of the secret key may involve the transmitter encrypting a message with the secret key and transmitting the encrypted message to the receiver. The receiver may decrypt the encrypted message with its secret key. If the decrypted message is intelligible, then the legitimate users generated the same secret key. In another example, the legitimate users may each apply a cryptographic hash function to the secret key and exchanging the hash values in a handshake process. The legitimate users can assume that they have generated the same secret key if their hash values agree.

If the secret keys are not the same, the transmitter may return to block 355 to repeat the generation of the secret key. If the secret keys are the same, the transmitter may make use of the secret key to secretly communicate with the receiver (block 371). User operations 350 may then terminate.

Due to the channel estimation errors and the time division duplex constraints of wireless communication, at each handshaking procedure, for a secret key with a fixed key length, the probability of key disagreement (the legitimate users generating different secret keys) is a function of the phase estimation error and the number of bits to represent a bin index. If the phase estimation error is very small, for a fixed codeword length, the probability of key disagreement is also significantly small. Specially, in the case of perfect channel estimates, two users always generate a pair of identical secret keys; thus the probability of key disagreement is zero.

Given a fixed phase estimate error, on the other hand, as the codeword length increases, i.e., the phase space is partitioned into more bins, the probability of key disagreement (approximately) monotonically increases. However, the secret key can be generated at a higher rate. There are therefore tradeoffs among the probability of key disagreement, the phase estimation error, and the length of the secret key.

As discussed above, a drawback of the phase-based secret key generation without public communication is that the probability of key disagreement between the generated secret keys may be high due to the imperfect phase estimation at the legitimate users. In particular, when the estimated phase of the wireless channel is close to the boundary between two consecutive bins or when the phase estimation error is high, there is a high probability that the estimated phase is unable to project onto the correct bin.

One way to reduce the probability that the estimated phase will project to an incorrect bin is to increase a separation between consecutive bins. Increasing the separation between consecutive bins may be similar to increasing a distance (e.g., a hamming distance) between consecutive codewords. By increasing the separation between consecutive bins, a probability that an estimated phase projects onto an incorrect bin is reduced. In other words, compensation for the negative effects of imperfect channel estimation (caused by measurement noise, for example) is provided. Furthermore, tolerance of the imperfect reciprocity of a wireless channel (e.g., due to half-duplex constraints of communications systems) is also increased.

Figure 4A:
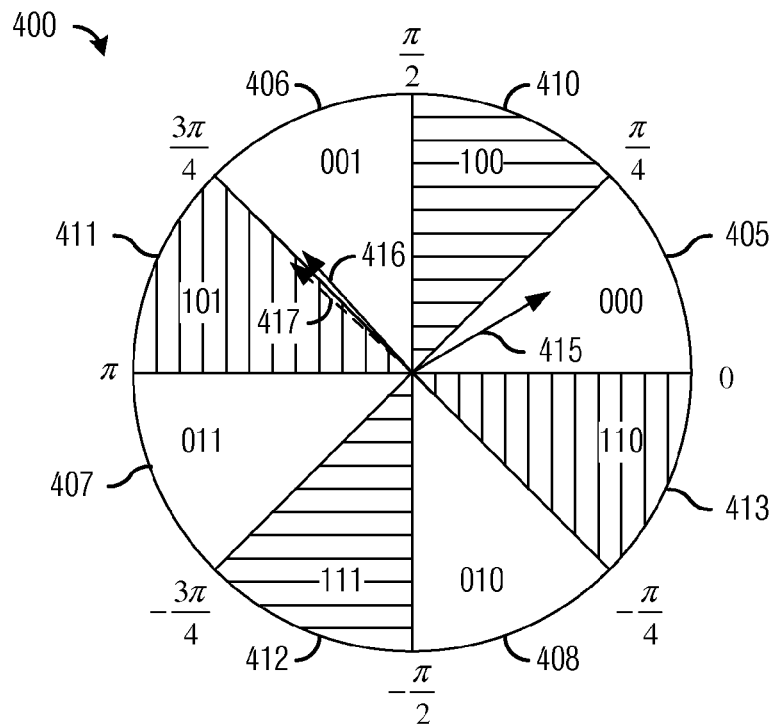
FIG. 4a is a phase quantization diagram for use in phase-based secret key generation with public communications.

FIG. 4a illustrates a phase quantization diagram 400 for use in phase-based secret key generation with public communications. Phase-based secret key generation with public communications makes use of a public exchange of information to help reduce a probability that an estimated phase projects onto an incorrect bin, thereby compensating for the negative effects of imperfect channel estimation.

Phase quantization diagram 400 includes Q=eight ($2^k$ with k=3) bins (also referred to as phase quantization bins), with each bin spanning $$\frac{\pi}{4}$$

radians. Although shown as having equal sized bins, the bins may differ in size. However, instead of using all eight bins to quantize an estimated phase, the eight bins may be partitioned into $2^m$ groups of bins with each bin comprising $2^{k-m}$ bins, where m is less than k. As shown in FIG. 4a, k=3 and m=1. Rather than selecting contiguous bins for placement into each of the $2^m$ groups, the bins are selected so that the bins within a group are distributed substantially equally about a phase quantization space, such as shown in phase quantization diagram 400. For example, bins 405, 406, 407, and 408 belong to a first group and bins 410, 411, 412, and 413 belong to a second group. Each bin may be assigned a k-bit codeword.

For example, each bin within a single group may be labeled with a k-bit codeword numbered according to a Gray code, with m bits out of the k bits representing a group number. As shown in FIG. 4a, bins with a most significant bit equal to zero (i.e., bins 405, 406, 407, and 408) belong to the first group and bins with a most significant bit equal to one (i.e., bins 410, 411, 412, and 413) belong to the second group.

When quantizing an estimated phase, only the bins belonging to a single group are used to quantize the estimated phase. For discussion purposes, let vector 415 represent an estimated phase to be quantized and bins belonging to the first group are used to quantize vector 415. Then, vector 415 may quantize to bin 405. If a vector is on an edge of a bin, such as vector 416, then estimation error may move the vector out of its correct bin. But with groups of bins containing non-contiguous bins, even if due to estimation error, a vector moves out of its correct bin, it may be unlikely that the quantization process would result in the vector being quantized to an incorrect bin. For example, if due to estimation error, vector 416 moves into bin 411 (shown as dashed vector 417), the quantization process would still select bin 406 as the quantized representation of vector 416.

To ensure that the legitimate users are using the same group of bins to quantize the estimated phases, the m bits may be shared between the legitimate users by transmission over public channels. The m bits may herein be referred to as public information. While the m bits are transmitted over public channels and may be intercepted by an eavesdropper, the other (k−m) bits are kept secret.

The use of groups of bins with bins arranged so that they are distributed substantially equally about the phase quantization diagram and public bits to identify the group of bins used in quantization may introduce guard bands between the bins used in the quantization of estimated phases. As the number of groups of bins (and therefore, the public bits) increases, the size of the guard bands also increases, making the quantization of estimated phases more resilient to channel estimation errors.

Figure 4B:
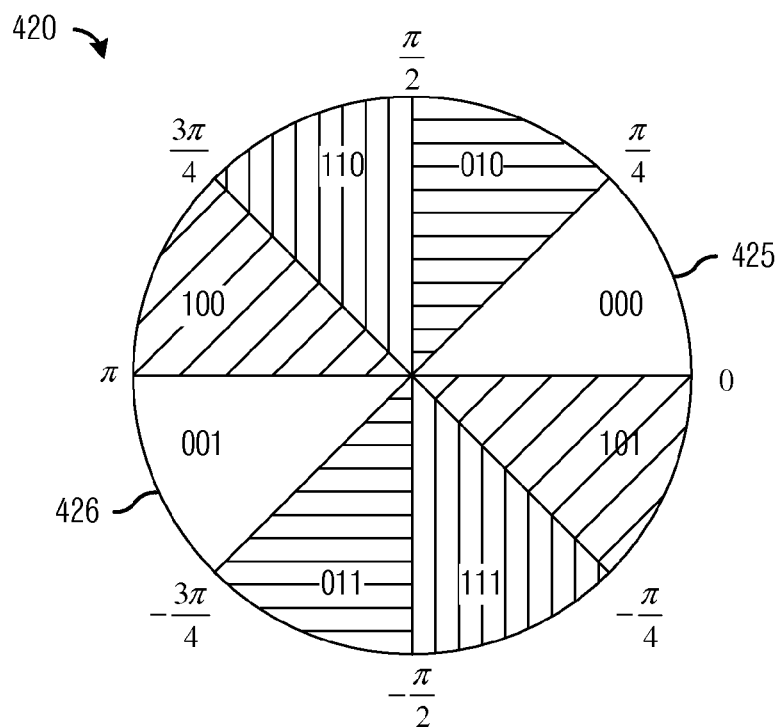
FIG. 4b is a phase quantization diagram for use in phase-based secret key generation with public communications, where k=3 and m=2.

FIG. 4b illustrates a phase quantization diagram 420 for use in phase-based secret key generation with public communications, where k=3 and m=2. Phase quantization diagram 420 includes Q=eight ($2^k$ with k=3) bins, with each bin spanning $$\frac{\pi}{4}$$

radians. With m=2, there are four groups of bins with 2 bins per group of bins. As in phase quantization diagram 400, the two bins per group of bins are distributed substantially equally about phase quantization diagram 400. As shown in FIG. 4b, similarly cross-hatched bins belong to the same group of bins. For example, bins 425 and 426 belong to the same group of bins. Also like phase quantization diagram 400, each bin may be assigned a unique k-bit codeword. Since m=2, one bit is available for secret key generation.

Since there are some bits in codewords reserved for public communication, the secret key rate, which is how many secret bits that may be generated in a second, in the embodiments is less than that in the phase-based secret key generation without public communications. Ideally, it is desirable to achieve a high secret bit rate. However, different from information transmission, the secret key rate may not be the most important factor in the secret sharing. As an example, IEEE 802.1x recommendation suggests that the master keys are desirable to be refreshed every one hour, meaning that if the secret key length is 128 bits, the secret key rate needs to be 0.36 bits per second.

As a consequence, the question of how the similar secret keys can be generated with a high probability at the legitimate users becomes paramount. Introducing public communication bits into the secret key generation protocol essentially provides a partial answer to the posed question. Notice that assuming that no errors made in communicating m public bits over a public channel is not a demanding constraint given the fact that the public bit rate is very low. The ultimate goal here is to construct a secret key generation protocol such that (k−m) secret bits can be embedded in codewords and exchanging m public bits via a public channel does not give away any information about the secret key.

Since m bits are intended for the public communication between the legitimate users, the quantization bins are mapped into $2^m$ groups of bins. Note that in phase-based secret key generation without public communication, m=0, and there is only one group which contains all possible bins. Here, in phase-based secret key generation with public communication, each group contains $2^{k-m}$ quantization bins that are uniformly distributed and encoded by Gray coding. Based on the public bits, the eavesdropper knows which group the secret bits are hidden in, but it does not know which bin in the group contains the secret bits since it observes statistically different channels. On the other hand, given the public bits and the channel estimates, the legitimate receiver is able to find the correct group and decode the most likely correct codeword containing the secret bits by choosing the bin in the selected group that is closest to the projected bin.

Although FIGS. 4a and 4b illustrate examples wherein the m most significant bits in each codeword are reserved for public communication. In reality, those m bits can be placed anywhere in codewords. For the look-up purpose, the information in phase quantization diagrams 400 and 420 are also presented in lookup table form in Table I and Table II.

TABLE I

A QUANTIZATION SCHEME WITH ONE-BIT PUBLIC COMMUNICATION FOR Q = 8

| Bin | Codeword | Quantization interval |
|---|---|---|
| 0 | 00 | $[0, \frac{\pi}{4})$ |
| 0 | 01 | $[\frac{\pi}{2}, \frac{3\pi}{4})$ |
| 0 | 11 | $[-\frac{\pi}{2}, -\frac{\pi}{4})$ |
| 0 | 10 | $[-\pi, -\frac{3\pi}{4})$ |
| 1 | 00 | $[\frac{\pi}{4}, \frac{\pi}{2})$ |
| 1 | 01 | $[\frac{3\pi}{4}, \pi)$ |
| 1 | 11 | $[-\frac{\pi}{4}, 0)$ |
| 1 | 10 | $[-\frac{3\pi}{4}, -\frac{\pi}{2})$ |

TABLE II

A QUANTIZATION SCHEME WITH TWO-BIT PUBLIC COMMUNICATION FOR Q = 8

| Bin | Codeword | Quantization interval |
|---|---|---|
| 00 | 0 | $[0, \frac{\pi}{4})$ |
| 00 | 1 | $[-\pi, -\frac{3\pi}{4})$ |
| 01 | 0 | $[\frac{\pi}{4}, \frac{\pi}{2})$ |
| 01 | 1 | $[-\frac{3\pi}{4}, -\frac{\pi}{2})$ |
| 11 | 0 | $[\frac{\pi}{2}, \frac{3\pi}{4})$ |
| 11 | 1 | $[-\frac{\pi}{2}, -\frac{\pi}{4})$ |
| 10 | 0 | $[\frac{3\pi}{4}, \pi)$ |
| 10 | 1 | $[-\frac{\pi}{4}, 0)$ |

FIG. 4c illustrates a flow diagram of user operations 450 in secret communications, wherein the secret communications makes use of a secret key generated using phase-based secret key generation with public communications. User operations 450 may be indicative of operations occurring in a user, such as a transmitter in a legitimate user pair, as the user participates in secret communications with another user, such as a receiver in the legitimate user pair. User operations 450 may occur while the user is in a normal operating mode.

User operations 450 may be a multi-stage operation, with a first stage being channel estimation, a second stage being secret key generation, and a third stage being key verification. User operations 450 may begin with the transmitter coordinating with the receiver (block 455). The coordinating between the legitimate users may include specifying a length of the secret key, how often to update the secret key, how often to transmit pilot signals to generate the secret key, who goes first, a configuration of a phase quantization diagram, size of public information (m), configuration of groups of bins, and so forth. Coordination may occur each time the secret key is to be generated, at specified times, or so forth.

After coordinating, the transmitter may estimate the channel between the legitimate users using a pilot sequence transmitted by the receiver (block 457). Estimating the channel may involve the transmission of pilot signals by the receiver to allow the transmitter to estimate the channel and the transmission of pilot signals by the transmitter to allow the receiver to estimate the channel.

According to an embodiment, the estimating of the channel by the transmitter may not involve estimating an entirety of the channel's available frequency bands. If the channel comprises multiple frequency bands, the transmitter may elect to perform channel estimation only on a subset of the multiple frequency bands. Which ever subset of the multiple frequency bands the transmitter selects to use in channel estimation may need to be provided to the receiver so that it may perform channel estimates over the same subset of the multiple frequency bands. Information regarding the subset of the multiple frequency bands may be considered to be public information.

Based on the channel estimate, the transmitter may estimate or compute a phase of the channel (block 459). According to an embodiment, the estimation of the phase of the channel may require multiple channel estimates, and the number of channel estimates to be used may be specified during coordination, be pre-specified, or so on.

According to an embodiment, since the phase of a channel with high gain is more robust to change than that of a channel with low gain, it may be preferred for the transmitter to select a channel estimate with a highest gain from which to estimate or compute the phase of the channel. As an example, the transmitter may take several consecutive channel estimates and select a channel estimate with the highest gain as a basis to estimate or compute the phase of the channel. The transmitter may store a number of channel estimate in its memory, where the number of channel estimates stored may be determined based on memory storage availability, acceptable latency, and so forth, and when the transmitter has a need to estimate or compute the phase of the channel, the transmitter may select from channel estimates stored in the memory.

As discussed above, the transmitter may select the channel estimate having the highest gain. However, if there are multiple channel estimates with substantially the same channel gain, the transmitter may select a most recent channel estimate since the most recent channel estimate is more likely to be more accurate. The channel estimates stored in the memory may be indexed (for example, based on when the channel estimate was performed) and an index (or indices) of the channel estimate(s) actually used by the transmitter to compute or estimate the channel phase may be provided to the receiver so that the receiver may estimate or compute its own channel phase based on the channel estimates made at the same (or substantially the same) time. The index or indices provided to the receiver may be considered to be public information.

In practice, the estimated phases at the transmitter and the receiver may be different due to the noise at the transceiver and the channel estimation error. Although the phase-based secret key generation technique with public communication may help the legitimate receivers generate the same secret keys, choosing the appropriate phases of the channel for secret sharing between the legitimate users will further increase the reliability of the secret key generation protocol. As an example, the following presents a technique involving the transmitter and the receiver to help select the best channel estimates for phase quantization.

At the Transmitter:
The transmitter first computes a threshold based on its channel estimate and examines its channel estimates to look for excursions in which there are M or more consecutive channel estimates have gain all above the threshold, where M is a positive integer value. There may be multiple excursions meeting the criteria.
The transmitter then randomly selects a subset of excursions and records the indices of estimates lying in (or about) the center of the selected excursions. The indices may correspond to times when the estimates where made. A common set of such indices is sent to the receiver over a public channel.

At the Receiver:
The receiver computes a threshold from its channel estimate.
For each index in the common set, the receiver checks if there are at least (M−1) channel estimates with gain above the threshold are centered about the index. An index meeting the criteria may be referred to as a qualified index.
A set of qualified indices are sent to the transmitter over the public channel.

Both the transmitter and the receiver will take the phases of channel estimates whose indices are in the set of qualified indices, and quantize them using the phase based secret key generation with public communications techniques described herein.

The transmitter may then quantize the estimated phase of the channel using a phase quantization diagram, such as phase quantization diagram 400 or 420 (block 461). The quantization of the estimated phase of the channel may result in a k-bit codeword that contains both public information (m bits) and secret information (k−m bits), where the k-bit codeword is a codeword assigned to a bin that the estimated phase of the channel projects into. The transmitter may then share the public information (block 463). For example, the transmitter may share which group of bins that it will use to quantize the estimated phase of the channel.

According to an embodiment, the transmitter may select one of the groups of bins prior to quantizing the estimated phase of the channel, which may provide a degree of protection from errors in the channel estimates. According to an alternative embodiment, the transmitter may choose to not select a group of bins and simply quantize the estimated phase of the channel with an entirety of a phase quantization diagram and then select the public information from which ever bin the estimated phase of the channel projects onto.

The public information may be used by the receiver to quantize its estimated phase of the channel. In general, which ever legitimate user (either the transmitter or the receiver) first performs the quantization of its estimated phase of the channel may provide the public information. Alternatively, it may be arranged to that the public information is provided by the transmitter and the receiver in an alternating fashion or that one of the legitimate users may store the public information from quantizing several estimated phases and send that public information to another legitimate user.

As discussed previously, the public information may be transmitted over a public channel. The public information may or may not be encoded to protect it from transmission errors. The secret bits (the k−m bits) associated with a quantized phase of the channel may then be used as the secret key, a part of the secret key, or provided to a function used to generate the secret key (block 465).

A check may be performed to determine if the secret key is complete (block 467). According to an embodiment, it may be possible to determine if the secret key is complete by counting a number of estimated phases have been quantized or a number of secret bits that have been generated. If the secret key is not complete, then the transmitter may return to block 457 to continue generating the secret key.

If the secret key is complete, then the transmitter and the receiver may verify that both have generated the same secret key (block 471). If the secret keys are the same, then they may be considered to be valid secret keys. As an example, a secret key verification procedure is to use a hash function. In particular, after the transmitter obtains its secret key, the transmitter may compute a hash value for the secret key, and send the hash value to the receiver. The receiver may verify whether its own hash value is similar to the hash value received from the value. If both hash values are the same, then the secret keys are equal and the receiver may send an agreement acknowledgment to the transmitter, and the two secret keys become a shared secret key. Otherwise, the legitimate users must discard the secret key and start a new secret key generation process.

Alternatively, the verification of the secret key may involve the transmitter encrypting a message with the secret key and transmitting the encrypted message to the receiver. The receiver may decrypt the encrypted message with its secret key. If the decrypted message is intelligible, then the legitimate users generated the same secret key.

In general, for a useful secret key, user operations 450 may need to be repeated over several coherent times to produce a secret key of desired length. The key verification may occur whenever a portion of the secret key is generated, when a specified number of portions of the secret key have been generated, or when the secret key is generated in its entirety. Performing key verification for less than the entire secret key may help to reduce a probability that the entire secret key is discarded at the expense of having to perform more key verification operations since only the portions of the secret key that does not match need be discarded.

If the secret keys are the same, the transmitter may make use of the secret key to communicate with the receiver (block 473). User operations 450 may then terminate. If the secret keys are not the same, the transmitter may return to block 455 to repeat the generation of the secret key. According to an embodiment, the generation of the secret key may be repeated without making any adjustments to parameters used in generating the secret key. According to an alternative embodiment, the generation of the secret key may be repeated after adjustments to parameters used in generating the secret key have been made (block 475). Examples of adjustments may include changes to a length of the secret key, how often to update the secret key, how often to transmit pilot signals to generate the secret key, who goes first, a configuration of a phase quantization diagram, size of public information (m), configuration of groups of bins, and so forth.

FIG. 4d illustrates a flow diagram of user operations 480 in secret communications, wherein the secret communications makes use of a secret key generated using phase-based secret key generation with public communications. User operations 480 may be indicative of operations occurring in a user, such as a receiver in a legitimate user pair, as the user participates in secret communications with another user, such as a transmitter in the legitimate user pair, wherein the user is a user that receives and makes use of the public communications. User operations 480 may occur while the user is in a normal operating mode.

User operations 480 may be substantially identical to user operations 450 except that the receiver receives public information from the transmitter to inform the receiver of the group of bins used by the transmitter when it quantized its estimate of phase of the channel (block 485 of FIG. 4c, for example). The receiver may then use the public information to select a corresponding group of bins and quantize its own estimate of phase of the channel (block 487).

In summary, instead of quantizing its estimates of phase of the channel without any public information, the receiver may make use of public information provided by the transmitter (block 463 of FIG. 4c, for example) to select a group of bins out of a phase quantization diagram that the receiver is using to quantize the estimates of the phase of the channel.

According to an embodiment, the legitimate users (i.e., the receiver and the transmitter) may alternate between being a source of the public information and a receiver of the public information. According to an alternative embodiment, during coordination (block 455 of FIG. 4c, for example), one of the legitimate users may be selected as the source of the public information and the other may be selected as the receiver of the public information. The selection may last for an entirety of the secret key generation process or several secret key generation processes. If a fixed source and receiver of public information does not yield adequate performance (secrecy rate, for example), the selection of fixed source and receiver may be changed or the secret key generation process may revert to the alternating public information source and receiver technique.

Figure 5:
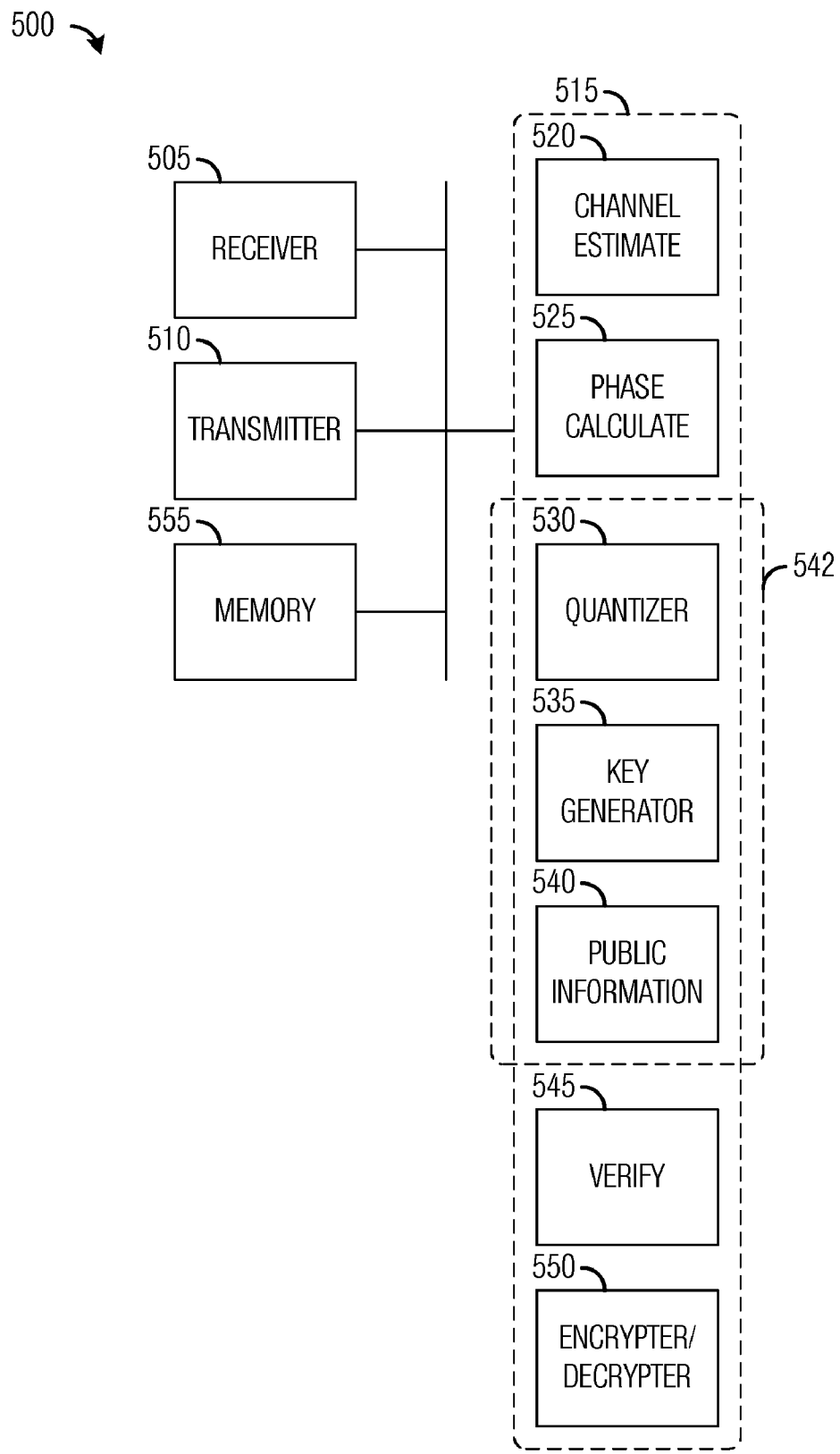
FIG. 5 is a diagram of an alternate illustration of a communications device.

FIG. 5 provides an alternate illustration of a communications device 500. Communications device 500 may be used to implement various ones of the embodiments discussed herein. As shown in FIG. 5, a receiver 505 is configured to receive information (such as public information and pilot signals) and a transmitter 510 is configured to transmit information (such as public information and pilot signals).

A channel estimate unit 520 is configured to make an estimate of a channel between communications device 500 and another communications device based on a pilot signal transmitted by the other communications device. A phase calculate unit 525 is configured to compute an estimate of a phase of the channel based on estimates of the channel provided by channel estimate unit 520. A quantizer unit 530 is configured to quantize the estimate of the phase of the channel provided by phase calculate unit 525, wherein the quantization of the estimate of the phase makes use of a phase quantization diagram, a look up table representation of the phase quantization diagram, and potentially public information provided by the other communications device.

A key generator unit 535 is configured to generate a secret key based on the quantization of the estimate of the phase provided by quantizer unit 530. According to an embodiment, the secret key may be a portion of a codeword associated with the quantization of the estimate of the phase, a function of a portion of a codeword associated with the quantization of the estimate of the phase, or a portion of a codeword associated with the quantization of the estimate of the phase. A public information unit 540 is configured to extract public information from the codeword associated with the quantization of the estimate of the phase. Collectively, quantizer unit 530, key generator unit 535, and public information unit 540 may for a key generate unit 542 that generates the secret key based on the estimate of the phase. A verify unit 545 is configured to verify a secret key generated by communications device 500 with a secret key generated by the other communications device. An encrypt/decrypt unit 550 is configured to encrypt and decrypt messages using the secret key.

The elements of communications device 500 may be implemented as specific hardware logic blocks. In an alternative, the elements of communications device 500 may be implemented as software executing in a processor, controller, application specific integrated circuit, or so on. In yet another alternative, the elements of communications device 500 may be implemented as a combination of software and/or hardware.

As an example, receiver 505 and transmitter 510 may be implemented as specific hardware blocks, while channel estimate unit 520, phase calculate unit 525, quantizer unit 530, key generate unit 535, public information unit 540, verify unit 545, and/or encode/decode unit 550 may be software modules executing in a processor 515 or custom compiled logic arrays of a field programmable logic array.

It is possible to evaluate the performance of phase-based secret key generation with and without public communications. First, a Rayleigh flat fading channel is used and channel estimates are modeled as in Equation (3.7). Assumptions include both legitimate users estimate the channel at the same rate, for example, sampling (estimating) time=5 ms, but at different times (due to half-duplex constraints), with an uplink channel being estimated 0.1 ms ahead of a downlink channel. Based on their channel measurement, the transmitter and the receiver compute their corresponding thresholds based on their channel measurement as follows:

$$q = E[X] + \alpha \sigma[X]$$

where X is the channel measurement at the transmitter or the receiver, E[X] is the expectation of X, and σ[X] is the standard deviation of X.

The coherent time is defined as $$T_c = \frac{3c}{4\sqrt{\pi}\, v f_c},$$

where c is the speed of light, v is the user mobility, and $f_c$ is the carrier frequency. In simulations, the carrier frequency is 2.4 GHz.

The eavesdropper completely knows all information exchanged over the public channel, but by the quantization design it is not allowed to know the secret bits thanks to the proposed quantization. Hence, our secret key generation protocol is still perfectly secure against the eavesdropper.

The evaluation of the phase-based secret key generation with and without public communications using a probability of secret key disagreement, the secret key generation rate, and a randomness of the generated secret key. For probability of secret key disagreement, the probability of bit error probability $P_b$ is used. Assume K is the secret key length. The probability of secret key disagreement can be approximately calculated as $$P_k \approx K P_b.$$

Figure 6A:
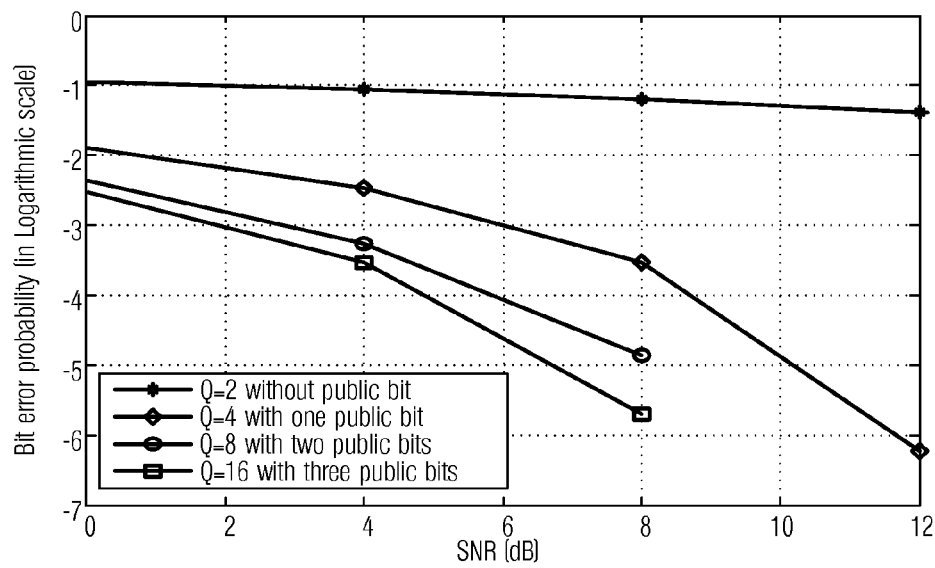
FIGS. 6a through 6e are plots of performance of phase-based secret key generation with and without public communications.

FIG. 6a illustrates a plot of probability of secret key disagreement (i.e., bit error probability) versus channel SNR for wireless communications systems using phase-based secret key generation with and without public communications. As shown in FIG. 6a, the probability of secret key disagreement drops significantly when public communications is used. For example, at SNR=12 dB, phase-based secret key generation with one-bit public communication improves the bit error exponent more than four times compared to no public communication at all. Furthermore, as the number of public bits increases, the bit error exponent decreases significantly. The improvement comes from the fact that introducing more public bits essentially enlarges the guard band between the phase bins in a group.

Figure 6B:
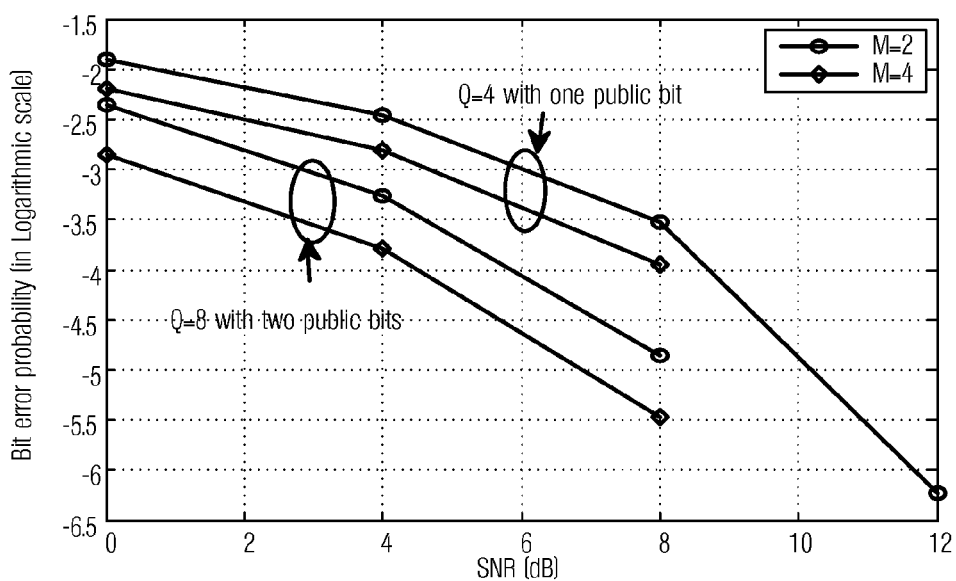
Figure 6C:
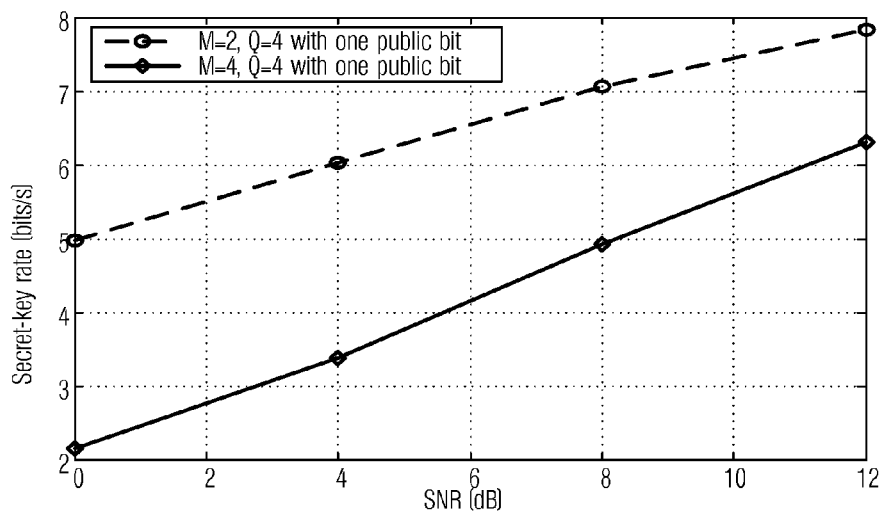

FIGS. 6b and 6c illustrate the impact of adjusting the secret key generation parameters on the phase-based secret key generation performance. More specifically, the minimum number of channel estimates (M) in a group of consecutive channel estimates is changed. Here, as M changes from 2 to 4, the bit error rate is reduced uniformly over all SNR, but the reduction is just about 0.5.

Figure 6D:
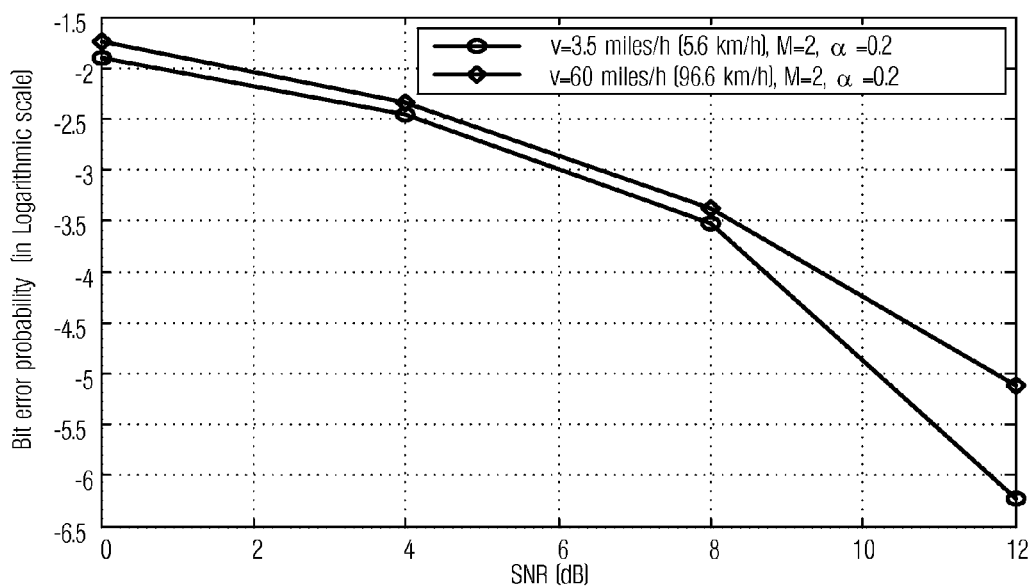
Figure 6E:
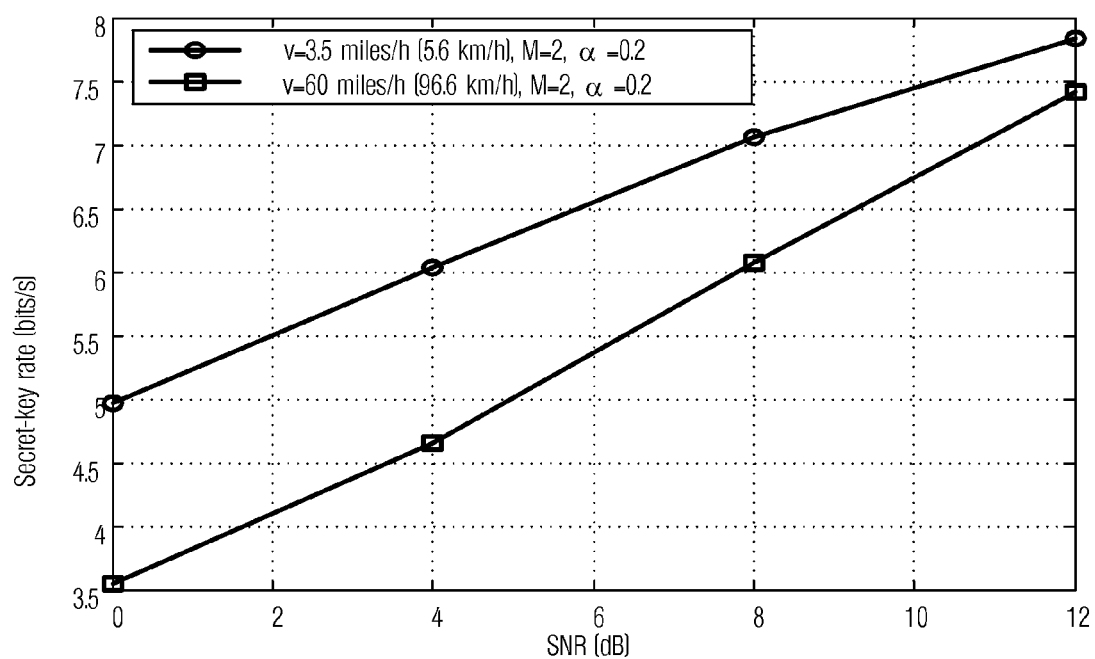

FIGS. 6d and 6e show the impact of legitimate user mobility on phase-based secret key generation performance. The effect of the user mobility to the performance of the phase-based secret key generation with public information is shown. FIGS. 6d and 6e provide the bit error probability and the secret key generation rate of the phase-based secret key generation with public information when M=2 and α=0.2. As shown in FIG. 6d, the error probability does not change much when the one of the users change its speed from the pedestrian speed to the driving speed. However, there is an increase in the secret key generation rate when the mobility decreases as shown in FIG. 6e.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for secure communications by a first user, the method comprising:
    estimating, by the first user, a channel between the first user and a second user, thereby producing a channel estimation comprising a first phase estimate of the channel;
    selecting a group of non-contiguous phase quantization bins from a plurality of groups of phase quantization bins;
    selecting an indicator of the selected group as public information;
    generating a first block of secret bits based on the first phase estimate of the channel and the public information; and transmitting the public information to the second user such that the public information is available for the second user to use in generating a second block of secret bits.

2. The method of claim 1, further comprising:
   selecting a set of one or more time instances when the first user performs the channel estimation; and
   setting an indicator of the selected set of one or more time instances as part of the public information.

3. The method of claim 1, further comprising:
   selecting a set of one or more frequency bands where the first user performs the channel estimation; and
   setting an indicator of the selected set of one or more frequency bands as part of the public information.

4. The method of claim 1, wherein generating a first block of secret bits comprises:
   mapping the first phase estimate of the channel to a codeword, wherein the codeword is associated with one quantization bin in the selected group of non-contiguous phase quantization bins; and
   selecting a first portion of the codeword as the first block of secret bits.

5. The method of claim 4, wherein the phase estimate of the channel is based on one or more estimates of the channel.

6. The method of claim 4, wherein the method further comprises repeating the estimating, the mapping, and the selecting a first portion until a plurality of first blocks of secret bits are generated.

7. The method of claim 6, wherein the plurality of first blocks of secret bits are concatenated to form a first secret key.

8. The method of claim 4, wherein there are $2^m$ groups of phase quantization bins, wherein m is greater than 0, wherein the codeword is composed of k bits, wherein the first portion of the codeword is composed of (k−m) bits, and wherein m other bits of the codeword form the indicator of the group of non-contiguous phase quantization bins, where k and m are integer values and k is greater than m.

9. The method of claim 8, wherein each group of phase quantization bins comprises $2^{k-m}$ phase quantization bins and the $2^{k-m}$ phase quantization bins are distributed substantially evenly within a phase quantization space.

10. The method of claim 1, wherein the second user generates the second block of secret bits using the public information and a second phase estimate of the channel, wherein the second user obtains the second phase estimate by estimating a channel between the second user and the first user.

11. The method of claim 10, wherein the second user generates the second block of secret bits by mapping the second phase estimate of the channel to a second codeword, wherein the mapping makes use of the public information.

12. The method of claim 1, wherein the estimating and the generating are repeated to produce a plurality of first blocks of secret bits, and wherein a first key is generated from the plurality of the first block of secret bits and a second key is generated from a plurality of second blocks of secret bits.

13. The method of claim 12, further comprising transmitting data information to the second user, wherein the data information is protected by a shared key that is derived from the first key and the second key.

14. A method for secure communications by a second user, the method comprising:
   receiving public information from a first user, wherein the public information indicates a group of non-contiguous phase quantization bins from a plurality of groups of phase quantization bins;
   estimating, by the second user, a channel between the second user and the first user, thereby producing a channel estimation comprising a second phase estimate of the channel; and
   generating a second block of secret bits based on the public information and the second phase estimate of the channel.

15. The method of claim 14, wherein the public information comprises an indication of a set of one or more time instances when the second user performs the channel estimation.

16. The method of claim 14, wherein the public information comprises an indication of a set of one or more frequency bands where the second user performs the channel estimation.

17. The method of claim 14, wherein generating a second block of secret bits comprises:
   quantizing the second phase estimate of the channel to a selected phase quantization bin in the group of non-contiguous phase quantization bins indicated by the public information, wherein each phase quantization bin in the plurality of groups of phase quantization bins has an associated codeword; and
   selecting a first portion of a codeword associated with the selected phase quantization bin as the second block of secret bits.

18. The method of claim 17, wherein there are $2^m$ groups of phase quantization bins, wherein m is greater than 0, wherein the codeword is composed of k bits, wherein the first portion of the codeword is composed of (k−m) bits, and wherein the public information corresponds to m other bits of the codeword, where k and m are integer values and k is greater than m.

19. The method of claim 14, further comprising repeating the estimating a channel and the generating a second block of secret bits to form a plurality of second blocks of secret bits, and combining the plurality of second blocks of secret bits to form a second key.

20. The method of claim 19, further comprising communicating with the first user to verify a validity of the second key.

21. The method of claim 20, further comprising transmitting data information to the first user, wherein the data information is protected with the second key in response to the second key being valid.

22. A communications device comprising:
   a channel estimate unit configured to estimate a channel between the communications device and a remote communications device;
   a phase calculate unit coupled to the channel estimate unit, the phase calculate unit configured to calculate a phase estimate of the channel based on the estimate of the channel from the channel estimate unit;
   a key generate unit coupled to the phase calculate unit, the key generate unit configured to generate a block of secret bits based on the phase estimate of the channel and a public information, wherein the public information indicates a group of non-contiguous phase quantization bins from a plurality of groups of phase quantization bins; and
   a verify unit coupled to the key generate unit, the verify unit configured to determine if a first block of secret bits generated by the key generate unit matches a second block of secret bits received from the remote communications device.

23. The communications device of claim 22, further comprising an encrypt/decrypt unit coupled to the key generate unit, the encrypt/decrypt unit configured to encrypt data transmitted to the remote communications device with the first block of secret bits.

24. The communications device of claim 22, wherein the key generate unit comprises:
   a quantizer coupled to the phase calculate unit, the quantizer configured to quantize the phase estimate of the channel to a selected phase quantization bin in the group of non-contiguous phase quantization bins; and
   a key generator unit coupled to the quantizer, the key generator unit configured to generate the block of secret bits based on the selected phase quantization bin.

25. The communications device of claim 22, wherein the verify unit comprises a compute unit configured to compute a first value based on the block of secret bits.

* * * * *